May 25, 1943.  A. JENEWEIN ET AL  2,320,331
RESILIENT TIRE
Filed May 5, 1942
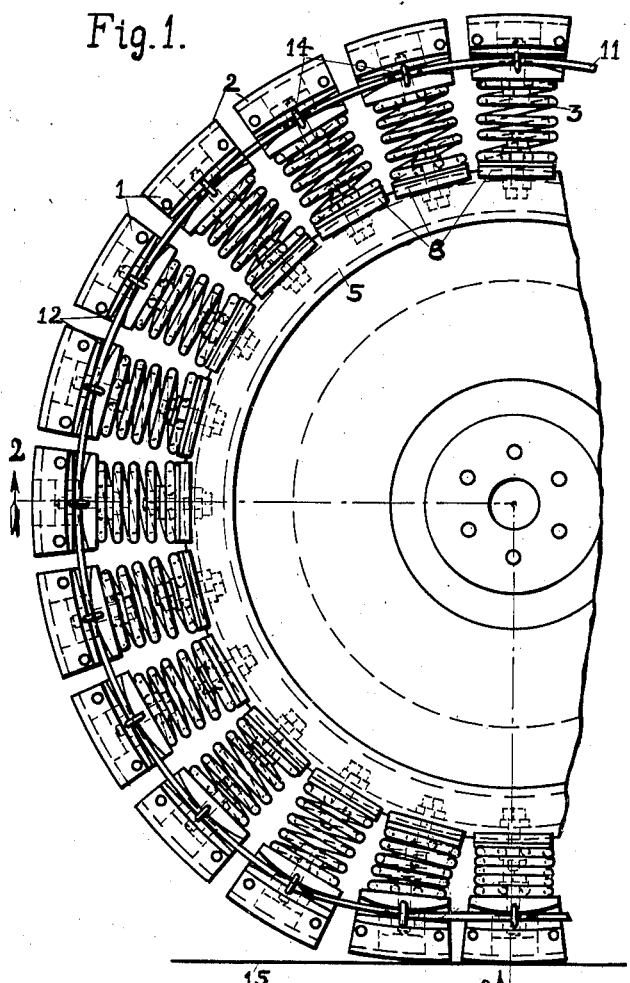
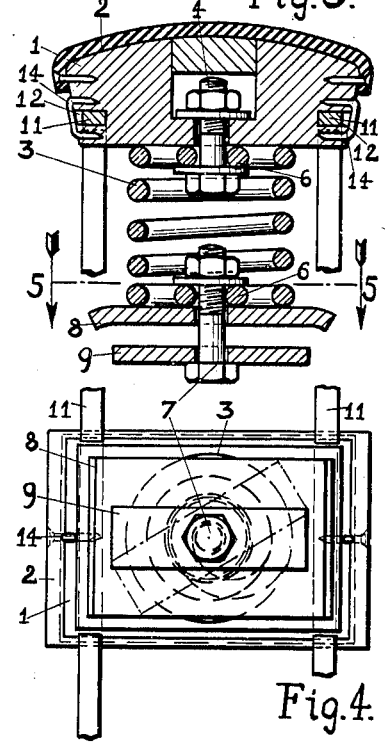
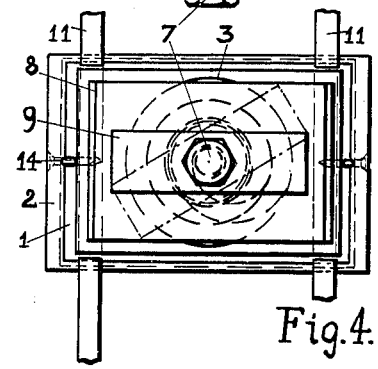
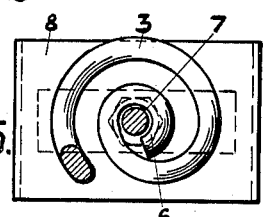
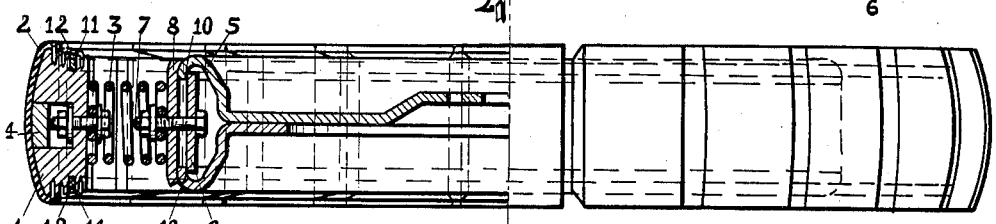
INVENTORS:
Agnes Jenewein and Herman Spath
BY Henry J. E. Metzler
Agt.

Patented May 25, 1943

2,320,331

UNITED STATES PATENT OFFICE 2,320,331

RESILIENT TIRE

Agnes Jenewein and Herman Spath,
New York, N. Y.

Application May 5, 1942, Serial No. 441,766

1 Claim. (Cl. 152—14)

The present invention relates to improvements in resilient tires for automobiles, bicycles, or other vehicles; and the objects of these improvements are, first, the provision of a resilient tire in which the customary inner rubber tube is replaced by spring members and in which the customary pneumatic rubber tire is replaced by a plurality of light weight blocks, preferably by wooden blocks; second, to afford facilities for the replacement of this resilient tire for a customary pneumatic tire without the necessity of changing the customary rims or wheels; and third, the provision of a resilient tire which is simple in construction, efficient in operation, inexpensive to manufacture, and the resilient action of which will greatly increase the comfort of persons riding in the vehicle.

Other objects and advantages of the present invention will be apparent during the course of the following description.

In the drawing, forming a part of this specification, and in which like numerals are employed to designate like parts throughout the same, Figure 1 is a side elevation of a device embodying the present invention and showing parts broken away; Fig. 2 is partially a section on the line 2—2, Fig. 1, and partially a top view; Fig. 3 is a vertical section of a part of the device; Fig. 4 is a bottom plan view of a part of the device; and Fig. 5 is a horizontal section of a part of the device on the line 5—5, Fig. 3.

The convex faces of a plurality of blocks 1, which may be covered with layers 2, preferably of rubber, form the thread of the tire. The layers 2 can be made of pieces of rubber, for instance from pieces of old tires, which would otherwise be wasted. The blocks 1 are made preferably of a light weight material, such as wood, and each block 1 is secured to a spring 3 by means of a screw 4 (Figs. 2 and 3) or in any other suitable manner. The springs 3 are secured to the rim 5 of a wheel at equal circumferential points. I prefer to carry out this feature of my invention in the manner shown in Figs. 2 to 5, where it will be seen that the end turn of the spring 3 forms a spiral and a spring eye 6 encompassing a bolt 7 which extends through a plate 8 resting upon the surface of the rim 5 and through another plate 9 which engages below the edges 10 of the rim 5. The plate 9 can swing on the bolt 7, as indicated in Fig. 4 in dash-and-dotted lines, which makes it possible to insert the plate 9 conveniently below the edges 10 of a normal rim such as is customarily used with pneumatic tires.

Two elastic rings 11, preferably of steel, are attached to both broad sides of the blocks 1 in order to hold the blocks in the proper position and to prevent a lateral movement of the blocks. These rings 11 are preferably held in grooves 12 on both broad sides of the blocks 1, and the rings 11 may be prevented from slipping out of the grooves 12 by means of clamps 14 or in any other suitable manner. The width of the grooves 12 may be gradually increased from the center toward the edges of the blocks by making one flange side of the U-shaped groove convex, as may be seen in Fig. 1, in order to facilitate a radial movement and to prevent a sharp bending of the rings 11 when a heavy load causes a considerable compression of the springs holding the blocks 1 which bear against the track 15, as illustrated at the bottom of Fig. 1.

While there has been shown and described and pointed out the fundamental novel features of the invention as applied to a single modification, it will be understood that various omissions and substitutions and changes on the form and details of the device illustrated and in its operation may be made by those skilled in the art without departing from the spirit of the invention. It is the intention, therefore, to be limited only as indicated by the scope of the following claim.

What we claim as our invention and desire to secure by Letters Patent of the United States is:

A vehicle tire comprising a plurality of light weight tread blocks each of which has in each broad side a U-shaped recess, the lower flange side of said recess being convex so that the width of each recess is gradually increased from the center toward the edges of the block; a plurality of plates secured to the rim of the wheel at equal circumferential points, each of said plates carrying a spring to which one of said tread blocks is secured; two resilient rings extending through the recesses on the broad sides of said tread blocks and being adapted to connect said blocks to each other and to hold them in position; and clamps holding said resilient rings in said recesses.

AGNES JENEWEIN.
HERMAN SPATH.